US012535965B2

(12) United States Patent
Kahn et al.

(10) Patent No.: US 12,535,965 B2
(45) Date of Patent: Jan. 27, 2026

(54) APPARATUS, METHOD, AND COMPUTER PROGRAM FOR TRACKING DATA OR ANALYTICS IN A STORAGE

(71) Applicant: NOKIA TECHNOLOGIES OY, Espoo (FI)

(72) Inventors: Colin Kahn, Morris Plains, NJ (US); Gerald Kunzmann, Munich (DE); Saurabh Khare, Bangalore (IN); Anja Jerichow, Grafing bei München (DE); Yannick Lair, Voisins le Bretonneux (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/939,134

(22) Filed: Sep. 7, 2022

(65) Prior Publication Data
US 2023/0075022 A1 Mar. 9, 2023

Related U.S. Application Data

(60) Provisional application No. 63/242,105, filed on Sep. 9, 2021.

(51) Int. Cl.
G06F 3/06 (2006.01)
(52) U.S. Cl.
CPC .......... G06F 3/0655 (2013.01); G06F 3/0604 (2013.01); G06F 3/0673 (2013.01)
(58) Field of Classification Search
CPC ..... G06F 3/0655; G06F 3/0604; G06F 3/0673
See application file for complete search history.

(56) References Cited

U.S. PATENT DOCUMENTS

| 9,912,752 | B1* | 3/2018 | Davis | G06F 16/2365 |
| 2015/0156243 | A1* | 6/2015 | Skog | H04L 65/765 |
| | | | | 709/219 |
| 2017/0085547 | A1* | 3/2017 | De Aguiar | H04L 63/10 |
| 2018/0367610 | A1* | 12/2018 | Wang | H04L 67/1097 |
| 2021/0218551 | A1* | 7/2021 | Moriarty | H04L 63/20 |
| 2022/0027205 | A1* | 1/2022 | Wang | G06F 9/45558 |

OTHER PUBLICATIONS

3GPP TS 23.288 V17.1.0 (Jun. 2021), Technical Specification, 3rd Generation Partnership Project; Technical Specification Group Services and System Aspects; Architecture enhancements for 5G System (5GS) to support network data analytics services (Release 17), Jun. 2021.

* cited by examiner

Primary Examiner — Reginald G Bragdon
(74) Attorney, Agent, or Firm — SQUIRE PATTON BOGGS (US) LLP

(57) ABSTRACT

The disclosure relates to an apparatus comprising at least one processor and at least one memory including computer code for one or more programs, the at least one memory and the computer code configured, with the at least one processor, to cause the apparatus at least to: receive one or more rules for storing data or analytics in a storage; determine a storage approach based on the one or more rules for storing data or analytics in the storage; and track data or analytics in the storage and determine whether to store, update or remove all or a portion of the data or analytics in the storage based on the storage approach.

14 Claims, 8 Drawing Sheets

700 Data or analytics consumer may send, to a network function, a storage handling request specifying one or more rules for storing data or analytics in a storage to allow the network function to determine a storage approach

Fig. 7

APPARATUS, METHOD, AND COMPUTER PROGRAM FOR TRACKING DATA OR ANALYTICS IN A STORAGE

CROSS REFERENCE TO RELATED APPLICATION

This application claims the benefit of U.S. Provisional Application No. 63/242,105, filed Sep. 9, 2022. The entire content of the above-referenced application is hereby incorporated by reference.

FIELD OF THE DISCLOSURE

The present disclosure relates to an apparatus, a method, and a computer program for tracking data or analytics in a storage and determining whether to store, update or remove all or a portion of data or analytics in the storage based on a storage approach in a communication system.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to an aspect there is provided an apparatus comprising means for: receiving one or more rules for storing data or analytics in a storage; determining a storage approach based on the one or more rules for storing data or analytics in the storage; and tracking data or analytics in the storage and determining whether to store, update or remove all or a portion of the data or analytics in the storage based on the storage approach.

Receiving one or more rules for storing data or analytics in the storage may comprise: receiving, from a data or analytics producer or a network operator, a storage policy specifying one or more rules for storing data or analytics in the storage.

Receiving one or more rules for storing data or analytics in the storage may comprise: receiving, from a data or analytics consumer, a storage handling request specifying one or more rules for storing data or analytics in the storage.

The apparatus may comprise means for: sending, to the data or analytics consumer, a response specifying whether the storage handling request has been accepted, partially accepted or rejected.

The apparatus may comprise means for: sending, to the data or analytics consumer, a uniform resource indicator for fetching the data or analytics in the storage.

The apparatus may comprise means for: sending, to the data or analytics consumer, the storage approach.

Determining a storage approach based on the one or more rules for storing data or analytics in the storage may comprise: determining a storage approach based on at least one of the storage policy and the storage handling request.

Determining a storage approach based on the one or more rules for storing data or analytics in the storage may comprise: determining a storage approach based on configuration information.

The configuration information may comprise precedence information specifying that the storage policy takes precedence over the storage handling request or that the storage handling request takes precedence over the storage policy.

The one or more rules for storing data or analytics in the storage may identify at least one of how long data or analytics are to be stored, what data or analytics are to be stored, what processing of data or analytics is to be performed, an indication for prioritizing data or analytics and an indication for sending an alert to a data or analytics consumer when data or analytics removal is imminent.

Different rules for storing data or analytics in the storage may apply to different data or analytics.

The apparatus may comprise means for: determining that data or analytics has been stored for a period of time greater than a threshold period of time; and send, to the data or analytics consumer, a request to determine how to handle the data or analytics or to obtain confirmation that data or analytics is to be removed or a notification giving notice about one or more rules for storing data or analytics in the storage.

The apparatus may comprise means for: tracking data or analytics in the storage on the apparatus and determine whether to store, update or remove all or a portion of the data or analytics in the storage on the apparatus based on the storage approach; or tracking data or analytics in the storage on another apparatus and determine whether to store, update or remove all or a portion of the data or analytics in the storage on another apparatus based on the storage approach.

The apparatus may comprise at least one of an analytics data repository function, a data collection coordination function, a messaging framework adaptor function or a network data analytics function.

According to an aspect there is provided an apparatus comprising at least one processor and at least one memory including computer code for one or more programs, the at least one memory and the computer code configured, with the at least one processor, to cause the apparatus at least to: receive one or more rules for storing data or analytics in a storage; determine a storage approach based on the one or more rules for storing data or analytics in the storage; and track data or analytics in the storage and determine whether to store, update or remove all or a portion of the data or analytics in the storage based on the storage approach.

Receiving one or more rules for storing data or analytics in the storage may comprise: receiving, from a data or analytics producer or a network operator, a storage policy specifying one or more rules for storing data or analytics in the storage.

Receiving one or more rules for storing data or analytics in the storage may comprise: receiving, from a data or analytics consumer, a storage handling request specifying one or more rules for storing data or analytics in the storage.

The at least one memory and the computer code may be configured, with the at least one processor, to cause the apparatus at least to: send, to the data or analytics consumer, a response specifying whether the storage handling request has been accepted, partially accepted or rejected.

The at least one memory and the computer code may be configured, with the at least one processor, to cause the apparatus at least to: send, to the data or analytics consumer, a uniform resource indicator for fetching the data or analytics in the storage.

The at least one memory and the computer code may be configured, with the at least one processor, to cause the apparatus at least to: send, to the data or analytics consumer, the storage approach.

Determining a storage approach based on the one or more rules for storing data or analytics in the storage may comprise: determining a storage approach based on at least one of the storage policy and the storage handling request.

Determining a storage approach based on the one or more rules for storing data or analytics in the storage may comprise: determining a storage approach based on configuration information.

The configuration information may comprise precedence information specifying that the storage policy takes precedence over the storage handling request or that the storage handling request takes precedence over the storage policy.

The one or more rules for storing data or analytics in the storage may identify at least one of how long data or analytics are to be stored, what data or analytics are to be stored, what processing of data or analytics is to be performed, an indication for prioritizing data or analytics and an indication for sending an alert to a data or analytics consumer when data or analytics removal is imminent.

Different rules for storing data or analytics in the storage may apply to different data or analytics.

The least one memory and the computer code may be configured, with the at least one processor, to cause the apparatus at least to: determine that data or analytics has been stored for a period of time greater than a threshold period of time; and send, to the data or analytics consumer, a request to determine how to handle the data or analytics or to obtain confirmation that data or analytics is to be removed or a notification giving notice about one or more rules for storing data or analytics in the storage.

The at least one memory and the computer code may be configured, with the at least one processor, to cause the apparatus at least to: track data or analytics in the storage on the apparatus and determine whether to store, update or remove all or a portion of the data or analytics in the storage on the apparatus based on the storage approach; or track data or analytics in the storage on another apparatus and determine whether to store, update or remove all or a portion of the data or analytics in the storage on another apparatus based on the storage approach.

The apparatus may comprise at least one of an analytics data repository function, a data collection coordination function, a messaging framework adaptor function or a network data analytics function.

According to an aspect there is provided an apparatus comprising circuitry configured to: receive one or more rules for storing data or analytics in a storage; determine a storage approach based on the one or more rules for storing data or analytics in the storage; and track data or analytics in the storage and determine whether to store, update or remove all or a portion of the data or analytics in the storage based on the storage approach.

Receiving one or more rules for storing data or analytics in the storage may comprise: receiving, from a data or analytics producer or a network operator, a storage policy specifying one or more rules for storing data or analytics in the storage.

Receiving one or more rules for storing data or analytics in the storage may comprise: receiving, from a data or analytics consumer, a storage handling request specifying one or more rules for storing data or analytics in the storage.

The circuitry may be configured to: send, to the data or analytics consumer, a response specifying whether the storage handling request has been accepted, partially accepted or rejected.

The circuitry may be configured to: send, to the data or analytics consumer, a uniform resource indicator for fetching the data or analytics in the storage.

The circuitry may be configured to: send, to the data or analytics consumer, the storage approach.

Determining a storage approach based on the one or more rules for storing data or analytics in the storage may comprise: determining a storage approach based on at least one of the storage policy and the storage handling request.

Determining a storage approach based on the one or more rules for storing data or analytics in the storage may comprise: determining a storage approach based on configuration information.

The configuration information may comprise precedence information specifying that the storage policy takes precedence over the storage handling request or that the storage handling request takes precedence over the storage policy.

The one or more rules for storing data or analytics in the storage may identify at least one of how long data or analytics are to be stored, what data or analytics are to be stored, what processing of data or analytics is to be performed, an indication for prioritizing data or analytics and an indication for sending an alert to a data or analytics consumer when data or analytics removal is imminent.

Different rules for storing data or analytics in the storage may apply to different data or analytics.

The circuitry may be configured to: determine that data or analytics has been stored for a period of time greater than a threshold period of time; and send, to the data or analytics consumer, a request to determine how to handle the data or analytics or to obtain confirmation that data or analytics is to be removed or a notification giving notice about one or more rules for storing data or analytics in the storage.

The circuitry may be configured to: track data or analytics in the storage on the apparatus and determine whether to store, update or remove all or a portion of the data or analytics in the storage on the apparatus based on the storage approach; or track data or analytics in the storage on another apparatus and determine whether to store, update or remove all or a portion of the data or analytics in the storage on another apparatus based on the storage approach.

The apparatus may comprise at least one of an analytics data repository function, a data collection coordination function, a messaging framework adaptor function or a network data analytics function.

According to an aspect there is provided a method comprising: receiving one or more rules for storing data or analytics in a storage; determining a storage approach based on the one or more rules for storing data or analytics in the storage; and tracking data or analytics in the storage and determining whether to store, update or remove all or a portion of the data or analytics in the storage based on the storage approach.

Receiving one or more rules for storing data or analytics in the storage may comprise: receiving, from a data or analytics producer or a network operator, a storage policy specifying one or more rules for storing data or analytics in the storage.

Receiving one or more rules for storing data or analytics in the storage may comprise: receiving, from a data or analytics consumer, a storage handling request specifying one or more rules for storing data or analytics in the storage.

The method may comprise: sending, to the data or analytics consumer, a response specifying whether the storage handling request has been accepted, partially accepted or rejected.

The method may comprise: sending, to the data or analytics consumer, a uniform resource indicator for fetching the data or analytics in the storage.

The method may comprise: sending, to the data or analytics consumer, the storage approach.

Determining a storage approach based on the one or more rules for storing data or analytics in the storage may comprise: determining a storage approach based on at least one of the storage policy and the storage handling request.

Determining a storage approach based on the one or more rules for storing data or analytics in the storage may comprise: determining a storage approach based on configuration information.

The configuration information may comprise precedence information specifying that the storage policy takes precedence over the storage handling request or that the storage handling request takes precedence over the storage policy.

The one or more rules for storing data or analytics in the storage may identify at least one of how long data or analytics are to be stored, what data or analytics are to be stored, what processing of data or analytics is to be performed, an indication for prioritizing data or analytics and an indication for sending an alert to a data or analytics consumer when data or analytics removal is imminent.

Different rules for storing data or analytics in the storage may apply to different data or analytics.

The method may comprise: determining that data or analytics has been stored for a period of time greater than a threshold period of time; and send, to the data or analytics consumer, a request to determine how to handle the data or analytics or to obtain confirmation that data or analytics is to be removed or a notification giving notice about one or more rules for storing data or analytics in the storage.

The method may be performed by an apparatus.

The method may comprise: tracking data or analytics in the storage on the apparatus and determine whether to store, update or remove all or a portion of the data or analytics in the storage on the apparatus based on the storage approach; or tracking data or analytics in the storage on another apparatus and determine whether to store, update or remove all or a portion of the data or analytics in the storage on another apparatus based on the storage approach.

The apparatus may comprise at least one of an analytics data repository function, a data collection coordination function, a messaging framework adaptor function or a network data analytics function.

According to an aspect there is provided a computer program comprising computer executable code which when run on at least one processor is configured to: receive one or more rules for storing data or analytics in a storage; determine a storage approach based on the one or more rules for storing data or analytics in the storage; and track data or analytics in the storage and determine whether to store, update or remove all or a portion of the data or analytics in the storage based on the storage approach.

Receiving one or more rules for storing data or analytics in the storage may comprise: receiving, from a data or analytics producer or a network operator, a storage policy specifying one or more rules for storing data or analytics in the storage.

Receiving one or more rules for storing data or analytics in the storage may comprise: receiving, from a data or analytics consumer, a storage handling request specifying one or more rules for storing data or analytics in the storage.

The computer program may comprise computer executable code which when run on at least one processor is configured to: send, to the data or analytics consumer, a response specifying whether the storage handling request has been accepted, partially accepted or rejected.

The computer program may comprise computer executable code which when run on at least one processor is configured to: send, to the data or analytics consumer, a uniform resource indicator for fetching the data or analytics in the storage.

The computer program may comprise computer executable code which when run on at least one processor is configured to: send, to the data or analytics consumer, the storage approach.

Determining a storage approach based on the one or more rules for storing data or analytics in the storage may comprise: determining a storage approach based on at least one of the storage policy and the storage handling request.

Determining a storage approach based on the one or more rules for storing data or analytics in the storage may comprise: determining a storage approach based on configuration information.

The configuration information may comprise precedence information specifying that the storage policy takes precedence over the storage handling request or that the storage handling request takes precedence over the storage policy.

The one or more rules for storing data or analytics in the storage may identify at least one of how long data or analytics are to be stored, what data or analytics are to be stored, what processing of data or analytics is to be performed, an indication for prioritizing data or analytics and an indication for sending an alert to a data or analytics consumer when data or analytics removal is imminent.

Different rules for storing data or analytics in the storage may apply to different data or analytics.

The computer program may comprise computer executable code which when run on at least one processor is configured to: determine that data or analytics has been stored for a period of time greater than a threshold period of time; and send, to the data or analytics consumer, a request to determine how to handle the data or analytics or to obtain confirmation that data or analytics is to be removed or a notification giving notice about one or more rules for storing data or analytics in the storage.

The at least one processor may be part of an apparatus.

The computer program may comprise computer executable code which when run on at least one processor is configured to: track data or analytics in the storage on the apparatus and determine whether to store, update or remove all or a portion of the data or analytics in the storage on the apparatus based on the storage approach; or track data or analytics in the storage on another apparatus and determine whether to store, update or remove all or a portion of the data or analytics in the storage on another apparatus based on the storage approach.

The apparatus may comprise at least one of an analytics data repository function, a data collection coordination function, a messaging framework adaptor function or a network data analytics function.

According to an aspect there is provided an apparatus comprising means for: sending, to a network function, a storage handling request specifying one or more rules for storing data or analytics in a storage to allow the network function to determine a storage approach.

The apparatus may comprise means for: receiving, from the network function, a response specifying whether the storage handling request has been accepted, partially accepted or rejected.

The apparatus may comprise means for: receiving, from the network function, a uniform resource indicator for fetching the data or analytics in the storage.

The apparatus may comprise means for: receiving, from the network function, the storage approach.

The network function comprises an analytics data repository function, a data collection coordination function, a messaging framework adaptor function or a network data analytics function.

According to an aspect there is provided an apparatus comprising at least one processor and at least one memory including computer code for one or more programs, the at least one memory and the computer code configured, with the at least one processor, to cause the apparatus at least to: send, to a network function, a storage handling request specifying one or more rules for storing data or analytics in a storage to allow the network function to determine a storage approach.

The at least one memory and the computer code may be configured, with the at least one processor, to cause the apparatus at least to: receive, from the network function, a response specifying whether the storage handling request has been accepted, partially accepted or rejected.

The at least one memory and the computer code may be configured, with the at least one processor, to cause the apparatus at least to: receive, from the network function, a uniform resource indicator for fetching the data or analytics in the storage.

The at least one memory and the computer code may be configured, with the at least one processor, to cause the apparatus at least to: receive, from the network function, the storage approach.

The network function comprises an analytics data repository function, a data collection coordination function, a messaging framework adaptor function or a network data analytics function.

According to an aspect there is provided an apparatus comprising circuitry configured to: send, to a network function, a storage handling request specifying one or more rules for storing data or analytics in a storage to allow the network function to determine a storage approach.

The apparatus may comprise circuitry configured to: receive, from the network function, a response specifying whether the storage handling request has been accepted, partially accepted or rejected.

The apparatus may comprise circuitry configured to: receive, from the network function, a uniform resource indicator for fetching the data or analytics in the storage.

The apparatus may comprise circuitry configured to: receive, from the network function, the storage approach.

The network function comprises an analytics data repository function, a data collection coordination function, a messaging framework adaptor function or a network data analytics function.

According to an aspect there is provided a method comprising: sending, to a network function, a storage handling request specifying one or more rules for storing data or analytics in a storage to allow the network function to determine a storage approach.

The method may comprise: receiving, from the network function, a response specifying whether the storage handling request has been accepted, partially accepted or rejected.

The method may comprise: receiving, from the network function, a uniform resource indicator for fetching the data or analytics in the storage.

The method may comprise: receiving, from the network function, the storage approach.

The network function comprises an analytics data repository function, a data collection coordination function, a messaging framework adaptor function or a network data analytics function.

According to an aspect there is provided a computer program comprising computer executable code which when run on at least one processor is configured to: send, to a network function, a storage handling request specifying one or more rules for storing data or analytics in a storage to allow the network function to determine a storage approach.

The computer program may comprise computer executable code which when run on at least one processor is configured to: receive, from the network function, a response specifying whether the storage handling request has been accepted, partially accepted or rejected.

The computer program may comprise computer executable code which when run on at least one processor is configured to: receive, from the network function, a uniform resource indicator for fetching the data or analytics in the storage.

The computer program may comprise computer executable code which when run on at least one processor is configured to: receive, from the network function, the storage approach.

The network function comprises an analytics data repository function, a data collection coordination function, a messaging framework adaptor function or a network data analytics function.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

According to an aspect, there is provided a system comprising at least one of the apparatuses above.

In the above, many different aspects have been described. It should be appreciated that further aspects may be provided by the combination of any two or more of the aspects described above.

Various other aspects are also described in the following detailed description and in the attached claims.

List of Abbreviations

ADRF: Analytics Data Repository Function
AF: Application Function
AMF: Access and Mobility Management Function
API: Application Protocol Interface BS: Base Station
CU: Centralized Unit
DCCF: Data Collection Coordination Function
DL: Downlink
DU: Distributed Unit
gNB: gNodeB
GSM: Global System for Mobile communication
HSS: Home Subscriber Server
IoT: Internet of Things
LTE: Long Term Evolution
MAC: Medium Access Control
MFAF: Messaging Framework Adaptor Function
MS: Mobile Station
MTC: Machine Type Communication
NEF: Network Exposure Function
NF: Network Function
NR: New Radio
NRF: Network Repository Function
NWDAF: Network Data Analytics Function
PDU: Packet Data Unit
RAM: Random Access Memory
(R)AN: (Radio) Access Network
ROM: Read Only Memory
SMF: Session Management Function
NSSAI: Network Slice Selection Assistance Information
TR: Technical Report
TS: Technical Specification
UE: User Equipment
UMTS: Universal Mobile Telecommunication System
URI: Uniform Resource Indicator
3GPP: $3^{rd}$ Generation Partnership Project
5G: $5^{th}$ Generation
5GC: 5G Core network
5GS: 5G System

BRIEF DESCRIPTION OF THE FIGURES

Embodiments will now be described, by way of example only, with reference to the accompanying Figures in which:

FIG. 7 shows an example of a block diagram of a method for determining a storage approach, tracking data or analytics in a storage and determining whether to store, update or remove all or a portion of data or analytics in the storage based on the storage approach in a communication system, performed by a data or analytics consumer.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
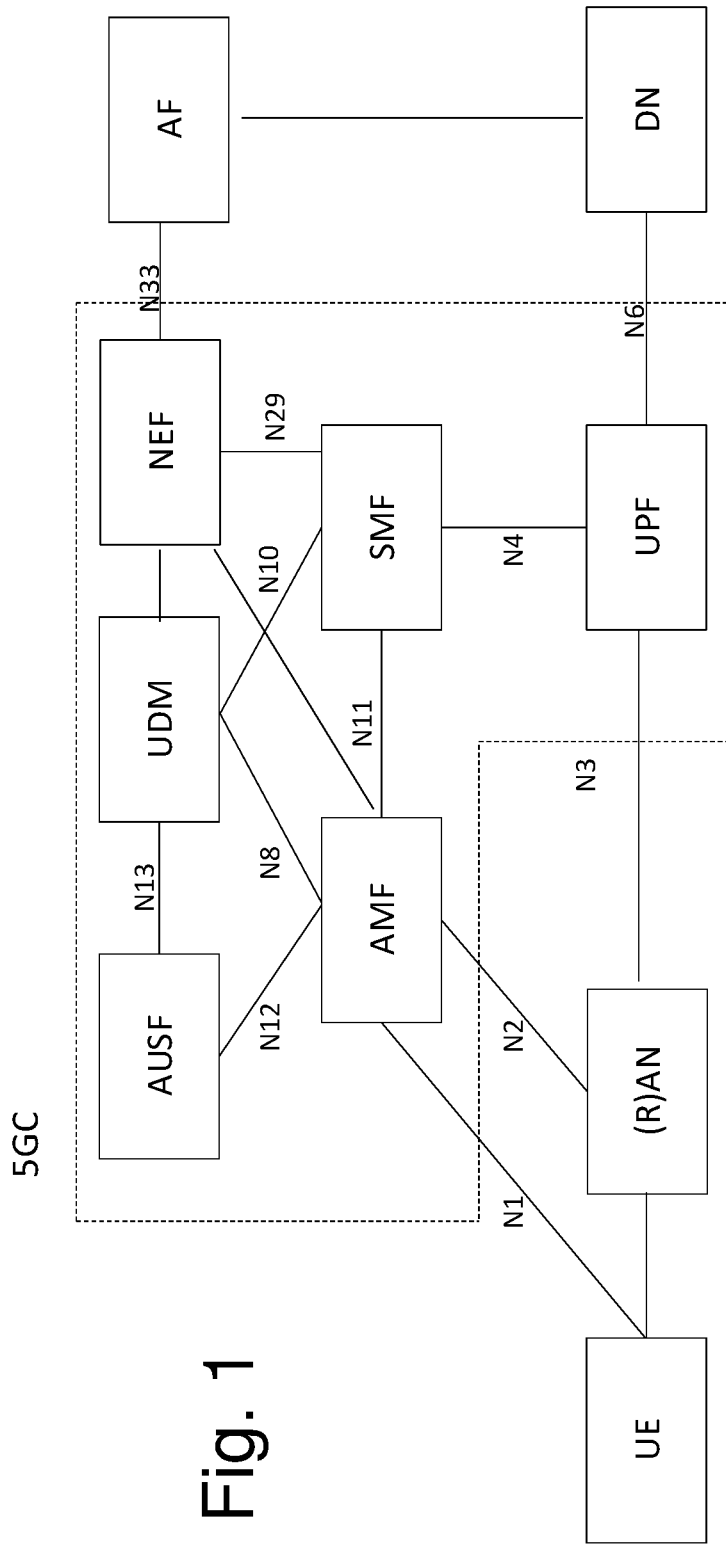
FIG. 1 shows a schematic representation of a 5G system.

FIG. 1 shows a schematic representation of a 5G system (5GS). The 5GS may comprise a terminal, a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions.

The 5GC may comprise an access and mobility management function (AMF), a session management function (SMF), an authentication server function (AUSF), a user data management (UDM), a user plane function (UPF) and/or a network exposure function (NEF).

The 5GC may also comprise an analytics data repository function (ADRF), a data collection coordination function (DCCF), a messaging framework adaptor function (MFAF) or a network data analytics function (NWDAF) although not illustrated.

Figure 2:
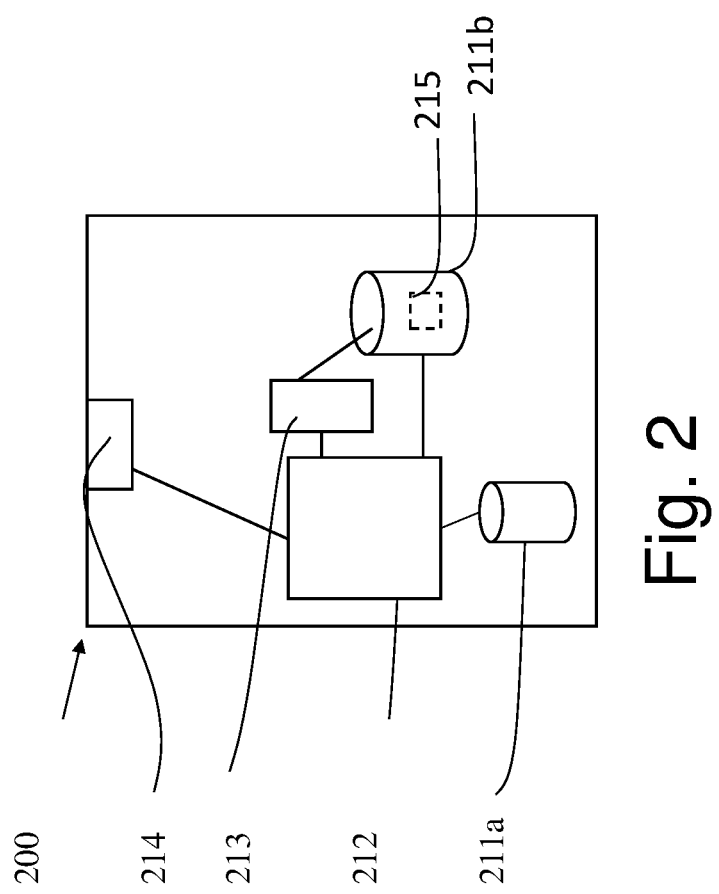
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
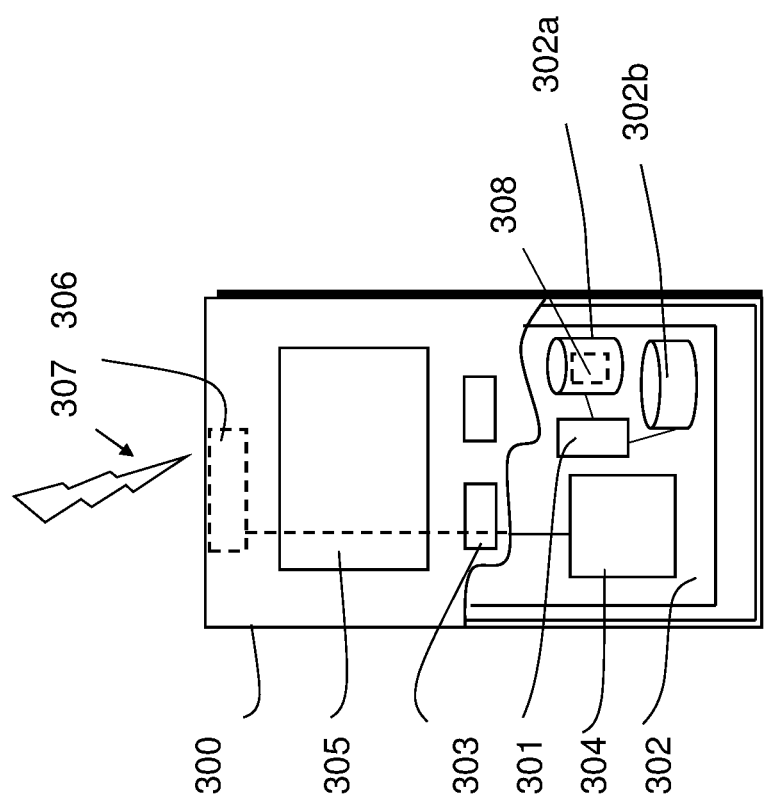
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302b and the ROM 302a. The at least one processor 301 may be configured to execute an appropriate software code 308. The software code 308 may for example allow to perform one or more of the present aspects. The software code 308 may be stored in the ROM 302a.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

As per 3GPP Release 17 the ADRF or the NWDAF may be configured to store data or analytics. Data or analytics may be directly provided to the ADRF or the NWDAF from the data or analytics producer. Alternatively, data or analytics may indirectly be provided to the ADRF or the NWDAF from the data or analytics producer via a data management framework. The data management framework may comprise the DCCF and/or the MFAF.

Several triggers have been defined to store data or analytics in the ADRF or the NWDAF. For example, a data and analytics consumer may specify in a request sent to the DCCF that the ADRF or the NWDAF is to store data or analytics. A data or analytics consumer may specify in a request sent to the DCCF, an instance of the ADRF or the NWDAF where data or analytics is to be stored. The DCCF may be configured to store certain data or analytics (e.g. store all data collected from the AMFs in a certain area) in the ADRF or the NWDAF.

The ADRF or the NWDAF support the storage, retrieval and removal of data or analytics to and/or from storage (e.g. 3GPP TS 23.288 clause 10).

A data or analytics consumer may request data or analytics from the ADRF or the NWDAF via the DCCF. The data or analytics consumer may specify that processing is to be applied to the data or analytics (see 3GPP TS 23.288, clause 5A.4). Processing may refer to summarizing data or analytics received from a data or analytics producer in order to reduce the volume of data or analytics reported to the data or analytics consumer or stored in the NWDAF. Currently, such processing of data or analytics is performed prior to the storage of the data or analytics in the ADRF or the NWDAF.

Once data or analytics is stored in the ADRF or the NWDAF, the data or analytics may remain there permanently unless some action is taken to remove it when the data or analytics is no longer needed. Over time, this may result in the ADRF or the NWDAF becoming a wasteland containing a huge volume of data or analytics that serves no purpose and is no longer needed.

3GPP TS 23.288 Release 17 clauses 6.2.6.3 and 6.15 describe how data or analytics may be stored in the ADRF or the NWDAF, how data or analytics may be retrieved from the ADRF or the NWDAF and how data or analytics may be removed from the ADRF or the NWDAF. A decision to store data or analytics in the ADRF or the NWDAF may be based on a subscription request from a data or analytics consumer where the request contains storage instructions.

A problem with the current standard is that it does not provide a mechanism to determine a storage approach, i.e. to determine whether to store, update or remove all or a portion of data or analytics on the ADRF or the NWDAF based on the storage approach.

One or more aspects of this disclosure provide a mechanism to determine a storage approach to determine whether to store, update or remove all or a portion of data or analytics on the ADRF or the NWDAF based on the storage approach.

One or more aspects of this disclosure provide a mechanism for the ADRF, the NWDAF, the DCCF or the MFAF to determine a storage approach to determine whether to store, update or remove all or a portion of data or analytics on the ADRF or the NWDAF.

The storage approach may be based on a storage policy and/or a storage handling request.

The storage policy may be provided by a network operator or a data or analytics source to the ADRF, the NWDAF, the DCCF or the MFAF. The storage handling request may be provided by a data or analytics consumer to the ADRF, the NWDAF, the DCCF or the MFAF.

The storage policy and/or the storage handling request may specify one or more rules. The one or more rules may identify how long data or analytics are to be stored, what data or analytics are to be stored, what processing of data or analytics is to be performed, an indication for prioritizing data or analytics (e.g. so that prioritized data can be stored and non-prioritized data can be removed) and an indication for sending (or not sending) an alert to a data or analytics consumer when data or analytics removal is imminent. Different rules may apply to different data or analytics.

Examples of rules may comprise:
store all data or analytics permanently
store processed data or analytics only
store data or analytics for a period of time (e.g. 2 hours or 2 years)
store raw data or analytics for a period of time and then process the data or analytics and store only a summary of the data or analytics for an additional period of time
store data or analytics for a period of time starting after a last time data or analytics was received and stored
store data or analytics for a period of time starting after a last time the data or analytics was requested
store a subset of received data or analytics (e.g. store only every second report)
remove old data or analytics
keep only a fixed number of data or analytics samples (e.g. keep a fixed number of notifications)
keep data or analytics for a fixed duration (e.g. keep notifications for a sliding time window duration)
compress old data or analytics
store data or analytics according to contents (e.g. radio link failure reports for certain cause codes are stored whilst radio link failure reports for other cause codes are not stored stored certain data or analytics only for a maximum period of time (e.g. store privacy related data for a maximum of one year due to legal requirements)

One or both of a storage policy and storage handling requests may be specified for a particular data or analytics, for a subset/group of data or analytics or all data or analytics.

The storage policy may take precedence over the storage handling request. Alternatively, the storage handling request may take precedence over the storage policy.

Storage Policy rules and Storage Handling Requests are considered in determining the Storage Approach to be applied for data or analytics storage in the ADRF or NWDAF.

If only a storage policy is specified (by a network operator or a data or analytics source), then a storage policy rule (e.g. store all AMF data or analytics for a maximum of two months) applicable to data or analytics may be part of the storage approach.

If only a storage handling request is specified (by a data or analytics consumer), then the request may be either accepted or rejected according to a configuration for honouring storage handling requests in the absence of a storage policy. The configuration for honouring storage handling requests in the absence of a storage policy may be specified (by a network operator or a data or analytics source). A storage handling request rule (e.g. store all AMF data or analytics for a maximum of four months) applicable to data or analytics may be part of the storage approach.

If both a storage policy is specified (by a network operator or a data or analytics source) and a storage handling request is specified (by a data or analytics consumer), then the storage handling request may be allowed based on the storage policy and precedence. For example, when the storage policy takes precedence over the storage handling request, the storage handling request may be allowed as long as it does not conflict with the storage policy. A storage handling request rule (e.g. store all AMF data or analytics for a maximum of four months) applicable to data or analytics may not be part of the storage approach because it conflicts with a storage policy rule (e. g. store all AMF data or analytics for a maximum of two months). Another storage handling request rule (e.g. store all AMF data or analytics for a maximum of one month) applicable to data or analytics may be part of the storage approach because it does not conflict with a storage policy rule (e. g. store all AMF data or analytics for a maximum of two months).

A storage handling request may be a separate message. The storage handling request may be part of an existing message (e.g. parameters added to an existing message requesting data or analytics).

When a data or analytics consumer sends a storage handling request to the ADRF, the NWDAF, the DCCF or the MFAF, the ADRF, the NWDAF, the DCCF or the MFAF may respond to the data or analytics consumer with a response specifying whether the storage handling request has been accepted or rejected (e.g. a storage handling request rule is accepted and aggregated on top of storage policy rules, a storage handling request rule is accepted and overwrites one of the storage policy rules, a storage handling request rule is rejected). The DCCF or the MFAF may respond to the data or analytics consumer with a response specifying the storage approach.

Two implementations are discussed below but it will be understood that other implementations may be contemplated.

In an implementation, the DCCF may determine the storage approach. The DCCF or the MFAF may track data or analytics stored in the ADRF or the NWDAF. The DCCF may determine whether to store, update or remove all or a portion of the data or analytics stored in the ADRF or the NWDAF.

In another implementation, the ADRF or the NWDAF may determine the storage approach. The ADRF or the NWDAF may track data or analytics stored in the ADRF or the NWDAF. The ADRF or the NWDAF may determine whether to store, update or remove all or a portion of the data or analytics stored in the ADRF or the NWDAF.

The ADRF, the NWDAF, the DCCF or the MFAF may send a uniform resource indicator (URI) or pointer to the data or analytics consumer after data or analytics is stored in the ADRF or the NWDAF for fetching the data or analytics. For example, if the data or analytics consumer sends a storage handling request comprising a rule specifying that all AMF notifications are to be stored for five months and the rule is part of the storage approach then the AMF notifications may be a subset of a large set of data or analytics. Therefore, the ADRF, the NWDAF, the DCCF or the MFAF may provide a URI that can be used by the data or analytics consumer to retrieve the AMF notifications. This saves the effort at the DCCF, ADRF or NWDAF to filter out AMF notifications from the data or analytics stored in the ADRF or the NWDAF.

The ADRF, the NWDAF, the DCCF or the MFAF may check (e.g. periodically or aperiodically) for data or analytics stored in the ADRF or the NWDAF for a period of time greater than a threshold period of time and not being used by a data or analytics consumer. Such check may trigger a request from the ADRF, the NWDAF, the DCCF or the MFAF to the data or analytics consumer to determine how to handle the data or analytics or to obtain confirmation that data or analytics is to be permanently removed. Alternatively, the ADRF, the NWDAF, the DCCF or the MFAF may send an alert to the data or analytics consumer to indicate an imminent action to the data or analytics stored in the ADRF or the NWDAF (following the application of a storage policy rule or as storage handling rule part of the storage approach).

Figure 4:
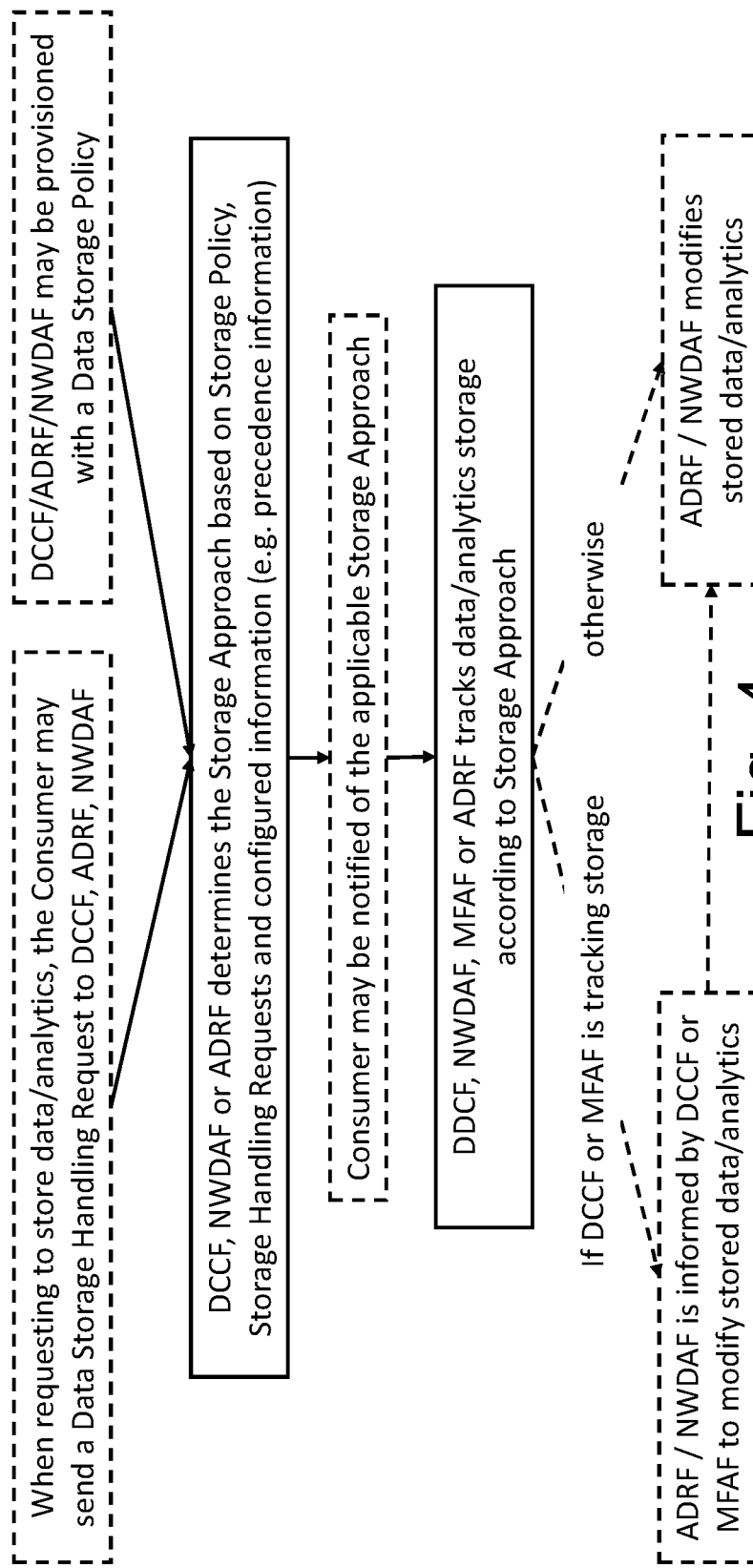
FIG. 4 shows an example of a block diagram of a method for determining a storage approach, tracking data or analytics in a storage and determining whether to store, update, or remove all or a portion of data or analytics in the storage based on the storage approach in a communication system.

FIG. 4 shows an example of a block diagram of a method for determining a storage approach, tracking data or analytics in the ADRF or the NWDAF and determining whether to store, update or remove all or a portion of the data or analytics stored in the ADRF or the NWDAF based on a storage approach.

When requesting data or analytics to be stored in the ADRF or the NWDAF, the data or analytics consumer may send a storage handling request to the ADRF, the NWDAF, or the DCCF.

The network operator or a data or analytics producer may provide a storage policy to the ADRF, the NWDAF or the DCCF.

The network operator or a data or analytics producer may provide configuration information (e.g. precedence information) to the ADRF, the NWDAF or the DCCF.

The ADRF, the NWDAF, or the DCCF may determine a storage approach based on the storage handling request, the storage policy and the configuration information.

The ADRF, the NWDAF, or the DCCF may send the storage approach to the data or analytics consumer.

The ADRF, the NWDAF, the DCCF or the MFAF may track data or analytics stored in the ADRF or the NWDAF and may determine whether to store, update or remove all or a portion of the data or analytics stored in the ADRF or the NWDAF based on the storage approach.

In an implementation, the DCCF or the MFAF may track data or analytics stored in the ADRF or the NWDAF. The DCCF or the MFAF may determine whether to store, update or remove all or a portion of the data or analytics stored in the ADRF or the NWDAF based on the storage approach. The DCCF or the MFAF may instruct the ADRF or the NWDAF to store, update or remove all or a portion of the data or analytics stored in the ADRF or the NWDAF. The ADRF or the NWDAF may store, update or remove all or a portion of the data or analytics stored in the ADRF or the NWDAF.

In another implementation, the ADRF or the NWDAF may track data or analytics stored in the ADRF or the NWDAF. The ADRF or the NWDAF may determine whether to store, update or remove all or a portion of the data or analytics stored in the ADRF or the NWDAF based on the storage approach. The ADRF or the NWDAF may store, update or remove all or a portion of the data or analytics stored in the ADRF or the NWDAF.

Figure 5:
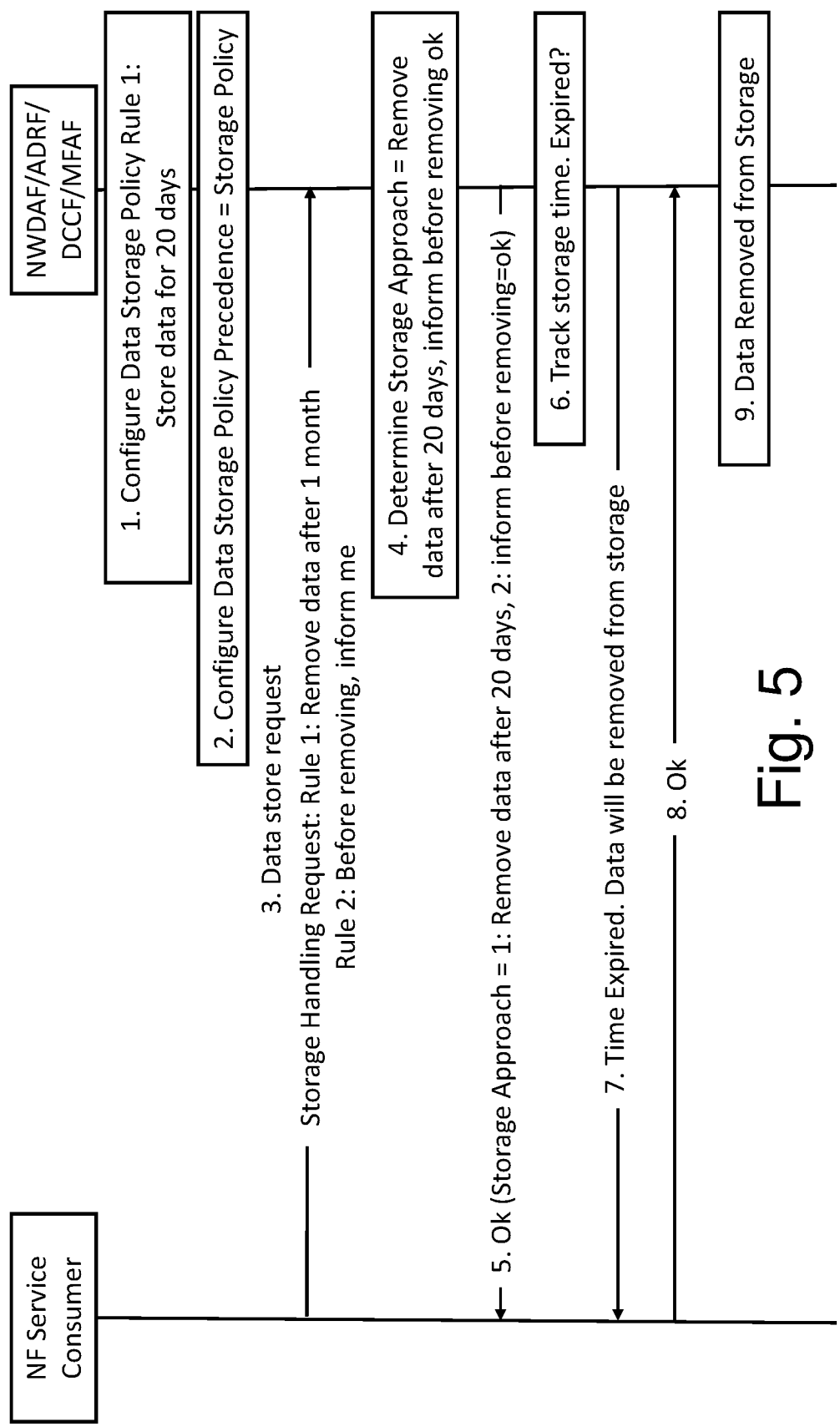
FIG. 5 shows an example of a signaling diagram of a method for determining a storage approach, tracking data or analytics in a storage and determining whether to store, update or remove all or a portion of data or analytics in the storage based on the storage approach in a communication system.

FIG. 5 shows an example of a signaling diagram of a method for determining a storage approach, tracking data or analytics in the ADRF or the NWDAF and determining whether to store, update or remove all or a portion of data or analytics stored in the ADRF or the NWDAF based on a storage approach.

In step 1 the ADRF, the NWDAF or the DCCF may receive a storage policy from a network operator or a data or analytics consumer. The storage policy may comprise a rule specifying that data or analytics is to be stored for twenty days.

In step 2 the ADRF, the NWDAF or the DCCF may receive configuration information (e.g. precedence information) from the network operator or a data or analytics consumer. The configuration information may specify that the storage policy takes precedence over a storage handling request.

In step 3 the ADRF, the NWDAF or the DCCF may receive a data or analytics store request from a data or analytics consumer. The data or analytics store request may comprise a storage handling request. The storage handling request may comprise a rule specifying that data or analytics is to be stored for one month. The storage handling request may comprise a rule specifying that the data or analytics consumer is to be informed before data or analytics is removed from the ADRF or the NWDAF.

In step 4 the ADRF, the NWDAF or the DCCF may determine a storage approach based on the storage policy, the storage handling request and the configuration information (e.g. precedence information). The storage approach may comprise a rule specifying that data or analytics is to be stored for twenty days (i.e. the storage policy took precedence over the storage handling request). The storage approach may comprise a rule specifying that the data or analytics consumer is to be informed before data or analytics is removed from the ADRF or the NWDAF.

In step 5 the ADRF, the NWDAF or the DCCF may send a response to the data or analytics consumer. The response may indicate that a rule of the storage handling request has been accepted and another rule of the storage handling request has been rejected. The response may indicate the storage approach.

In step 6, the ADRF, the NWDAF, the DCCF or the MFAF may track data or analytics stored in the ADRF or the NWDAF and may determine whether to store, update or remove all or a portion of the data or analytics stored in the ADRF or the NWDAF based on the storage approach.

In step 7 the ADRF, the NWDAF, the DCCF or the MFAF may send a request or a notification to the data or analytics consumer to obtain confirmation or inform the consumer that data or analytics is to be permanently removed.

In step 8 the ADRF, the NWDAF, the DCCF or the MFAF may receive a response from the data or analytics consumer to give confirmation or acknowledgement that data or analytics is to be permanently removed.

In step 9 the ADRF, the NWDAF, the DCCF or the MFAF may remove the data or analytics from the ADRF or the NWDAF.

The ADRF, the NWDAF, the DCCF or the MFAF as a single entity or function or a combination of any of the ADRF, the NWDAF, the DCCF or the MFAF may be an example of apparatus according to the invention.

Figure 6:
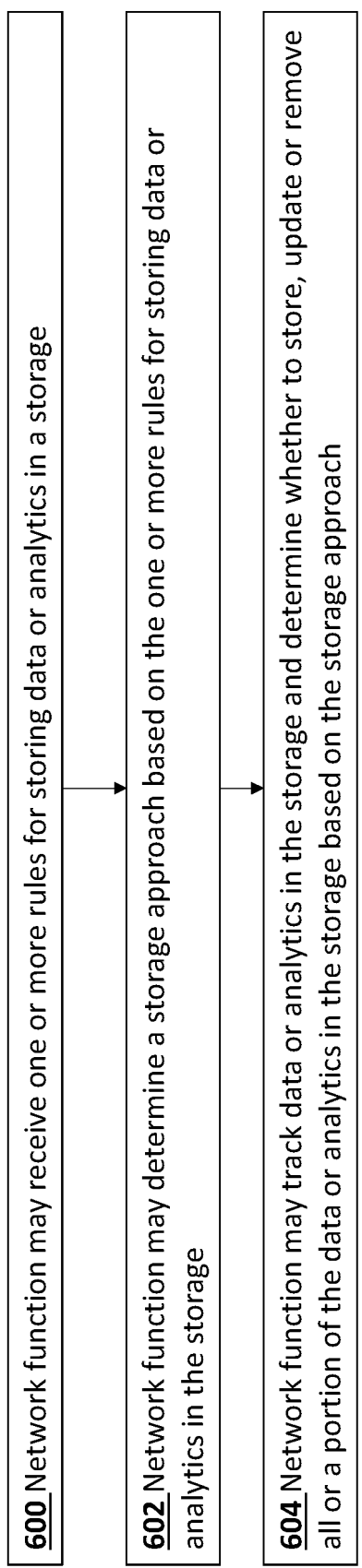
FIG. 6 shows an example of a block diagram of a method for determining a storage approach, tracking data or analytics in a storage and determining whether to store, update or remove all or a portion of data or analytics in the storage based on the storage approach in a communication system, performed by an analytics data repository function, a data collection coordination function, a messaging framework adaptor function or a network data analytics function.

FIG. 6 shows an example of a block diagram of a method for tracking data or analytics in the ADRF or the NWDAF and determining whether to store, update or remove all or a portion of data or analytics in the ADRF or the NWDAF based on a storage approach, performed by a network function such as the ADRF, the NWDAF, the DCCF or the MFAF.

In step 600 the network function may receive one or more rules for storing data or analytics in a storage.

In step 602 the network function may determine a storage approach based on the one or more rules for storing data or analytics in the storage.

In step 604 the network function may track data or analytics in the storage and determine whether to store, update or remove all or a portion of the data or analytics in the storage based on the storage approach.

Receiving one or more rules for storing data or analytics in the storage may comprises: receiving, from a data or analytics producer or a network operator, a storage policy specifying one or more rules for storing data or analytics in the storage.

Receiving one or more rules for storing data or analytics in the storage may comprises: receiving, from a data or analytics consumer, a storage handling request specifying one or more rules for storing data or analytics in the storage.

The network function may send, to the data or analytics consumer, a response specifying whether the storage handling request has been accepted, partially accepted or rejected.

The network function may send, to the data or analytics consumer, a uniform resource indicator for fetching the data or analytics in the storage.

The network function may send, to the data or analytics consumer, the storage approach.

Determining a storage approach based on the one or more rules for storing data or analytics in the storage may comprise: determining a storage approach based on at least one of the storage policy and the storage handling request.

Determining a storage approach based on the one or more rules for storing data or analytics in the storage may comprise: determining a storage approach based on configuration information.

The configuration information may comprise precedence information specifying that the storage policy takes precedence over the storage handling request or that the storage handling request takes precedence over the storage policy.

The one or more rules for storing data or analytics in the storage may identify at least one of how long data or analytics are to be stored, what data or analytics are to be stored, what processing of data or analytics is to be performed, an indication for prioritizing data or analytics and an indication for sending an alert to a data or analytics consumer when data or analytics removal is imminent.

Different rules for storing data or analytics in the storage apply to different data or analytics.

The network function may determine that data or analytics has been stored for a period of time greater than a threshold period of time. The network function may send, to the data or analytics consumer, a request to determine how to handle the data or analytics or to obtain confirmation that data or analytics is to be removed or a notification giving notice about one or more rules for storing data or analytics in the storage.

The network function may track data or analytics in the storage on the network function and determine whether to store, update or remove all or a portion of the data or analytics in the storage on the network function based on the storage approach.

The network function may track data or analytics in the storage on another network function and determine whether to store, update or remove all or a portion of the data or analytics in the storage on another network function based on the storage approach.

FIG. 7 shows an example of a block diagram of a method for tracking data or analytics in the ADRF or the NWDAF and determining whether to store, update or remove all or a portion of data or analytics in the ADRF or the NWDAF based on a storage approach, performed by a data or analytics consumer.

In step 700 the data or analytics consumer may receive, from the network function, a response specifying whether the storage handling request has been accepted, partially accepted or rejected.

The data or analytics consumer may receive, from the network function, a uniform resource indicator for fetching the data or analytics in the storage.

Figure 8:
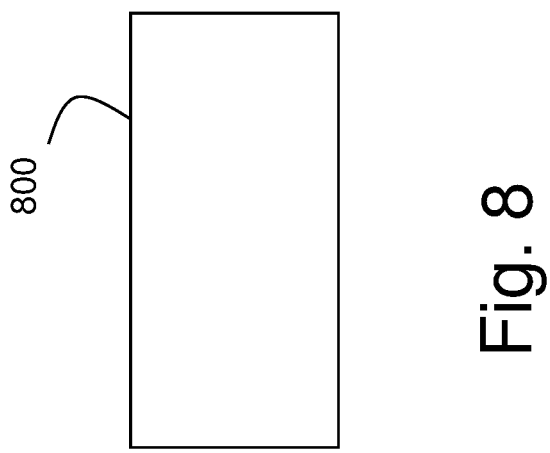
FIG. 8 shows a schematic representation of a non-volatile memory medium storing instructions which when executed by a processor allow a processor to perform one or more of the steps of the methods of FIGS. 6 and 7.

The data or analytics consumer may receive, from the network function, the storage approach. FIG. 8 shows a schematic representation of non-volatile memory media 800 storing instructions and/or parameters which when executed by a processor allow the processor to perform one or more of the steps of the methods of FIGS. 6 and 7.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 6 and 7, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
 (a) hardware-only circuit implementations (such as implementations in only analogue and/or digital circuitry);
 (b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising at least one of an analytics data repository function, a data collection coordination function, a messaging framework adaptor function or a network data analytics function for a core network of a telecommunications network, the apparatus comprising:
- at least one processor; and
- at least one memory including computer program code, of at least one of the analytics data repository function, the data collection coordination function, the messaging framework adaptor function or the network data analytics function, the computer code, when executed by the at least one processor, causing the apparatus at least to perform:
  - receiving, from a data producer or an analytics producer or a network operator, a storage policy comprising one or more rules for storing data or analytics in a storage of the core network;
  - receiving, from a data consumer or analytics consumer, a storage handling request specifying one or more rules for storing the data or the analytics in the storage of the core network, which are different than the one or more rules of the storage policy, wherein the one or more rules in the storage policy or the one or more rules specified by the storage handling request includes an indication for transmitting an alert to the data consumer or analytics consumer;
  - determining a storage approach based on whether or not a conflict exists between
    - the one or more rules for storing the data or the analytics in the storage of the core network that are comprised in the storage policy, and the one or more rules for storing the data or the analytics in the storage of the core network that are comprised in the storage handling request,
    - wherein the storage approach comprises at least one rule of the one or more rules in the storage policy and the one or more rules specified by the storage handling request that do not conflict, and wherein the storage approach excludes at least one rule of the one or more rules in the storage policy or the one or more rules specified by the storage handling request that do conflict;
  - storing, updating or removing all or a portion of the data or the analytics in the storage of the core network based on the storage approach; and
  - transmitting, based on the one or more rules in the storage policy or the one or more rules specified by the storage handling request, an alert to the data consumer or analytics consumer concerning the data or analytics removal.

2. The apparatus of claim 1, wherein the computer program code, when executed by the processor, causes the apparatus at least to perform:
- sending, to the data consumer or the analytics consumer from which the storage handling request is received, a response specifying whether the storage handling request has been accepted, partially accepted or rejected.

3. The apparatus of claim 1, wherein the computer program code, when executed by the processor, causes the apparatus at least to perform:
- sending, to the data consumer or the analytics consumer from which the storage handling request is received, a uniform resource indicator for fetching the data or the analytics in the storage of the core network.

4. The apparatus of claim 1, wherein the computer program code, when executed by the processor, causes the apparatus at least to perform:

- sending, to the data consumer or the analytics consumer from which the storage handling request is received, information concerning the storage approach.

5. The apparatus of claim 1, wherein the determining the storage approach further comprises:
- determining the storage approach based on configuration information.

6. The apparatus of claim 5, wherein the configuration information comprises precedence information specifying that the storage policy takes precedence over the storage handling request or that the storage handling request takes precedence over the storage policy.

7. The apparatus of claim 1, wherein, at least one of the one or more rules in the storage policy or the one or more rules specified by the storage handling request identifies at least one of how long the data or the analytics are to be stored, what of the data or the analytics are to be stored, what processing of the data or the analytics is to be performed, an indication for prioritizing the data or the analytics, or an indication for sending an alert to the data or the analytics consumer when the data or the analytics removal is imminent.

8. The apparatus of claim 1, wherein different rules for storing the data or the analytics in the storage of the core network apply to different data or analytics.

9. The apparatus of claim 1, wherein the computer program code, when executed by the processor, causes the apparatus at least to perform:
- determining that the data or the analytics has been stored for a period of time greater than a threshold period of time; and
- sending, to the data consumer or the analytics consumer from which the storage handling request is received: a request to determine how to handle the data or the analytics, a request to obtain confirmation that the data or the analytics is to be removed, or a notification giving notice about the one or more rules for storing the data or the analytics in the storage of the core network used in determining the storage approach.

10. The apparatus of claim 1, wherein the computer program code, when executed by the processor, causes the apparatus at least to perform:
- tracking the data or the analytics in the storage of the core network on the apparatus and determining whether to store, update or remove all or a portion of the data or the analytics in the storage of the core network on the apparatus based on the storage approach; or
- tracking the data or the analytics in the storage of the core network on another apparatus and determining whether to store, update or remove all or a portion of the data or the analytics in the storage of the core network on the other apparatus based on the storage approach.

11. An apparatus for a core network of a telecommunications network, comprising:
- at least one processor; and
- at least one memory including computer program code which, when executed by the at least one processor, causes the apparatus at least to perform:
  - sending, to a network function configured to operate as at least one of an analytics data repository function, a data collection coordination function, a messaging framework adaptor function or a network data analytics function, a storage handling request specifying one or more rules for storing data or analytics in a storage of the core network to allow the network function to determine a storage approach for storing, updating or removing all or a portion of the data or the analytics in the storage of the core network, wherein the one or more rules for storing the data or the analytics specified in the storage handling request includes an indication for the network function to transmit an alert to the apparatus;

receiving a storage approach from the network function, wherein the storage approach comprises at least one rule of one or more rules in a storage policy and at least one rule of the one or more rules in the storage handling request that have been determined not to conflict, and wherein the storage approach excludes at least one rule of the one or more rules in the storage policy or the one or more rules specified by the storage handling request that do conflict;

receiving, from the network function, an indication that the data or the analytics have been stored in the storage of the core network for a period of time greater than a threshold period of time specified in the determined storage approach; and receiving, from the network function based on the one or more rules in the storage policy or the one or more rules specified by the storage handling request, an alert that data or analytics removal is to occur.

12. The apparatus of claim 11, wherein the computer program code, when executed by the at least one processor, causes the apparatus at least to perform:

receiving, from the network function, a response specifying whether the storage handling request has been accepted, partially accepted or rejected.

13. The apparatus of claim 11, wherein the computer program code, when executed by the at least one processor, causes the apparatus at least to perform:

receiving, from the network function, a uniform resource indicator for fetching the data or the analytics in the storage of the core network.

14. A method, comprising:

receiving, by an apparatus connected to a core network of a telecommunications network, a storage policy comprising one or more rules for storing data or analytics in a storage of the core network, wherein the apparatus is configured to operate as at least one of an analytics data repository function, a data collection coordination function, a messaging framework adaptor function or a network data analytics function;

receiving, from a data consumer or analytics consumer, a storage handling request specifying one or more rules for storing data or analytics in the storage of the core network, which are different than the one or more rules of the storage policy, wherein the one or more rules in the storage policy or the one or more rules specified by the storage handling request includes an indication for transmitting an alert to the data consumer or analytics consumer;

determining a storage approach based on whether or not a conflict exists between the one or more rules for storing the data or the analytics in the storage of the core network that are comprised in the storage policy, and the one or more rules for storing the data or the analytics in the storage of the core network that are comprised in the storage handling request, wherein the storage approach comprises at least one rule of the one or more rules in the storage policy and the one or more rules specified by the storage handling request that do not conflict, and wherein the storage approach excludes at least one rule of the one or more rule in the storage policy or the one or more rules specified by the storage handling request that do conflict; and storing, updating or removing all or a portion of the data or the analytics in the storage of the core network based on the storage approach; and transmitting, based the one or more rules in the storage policy or the one or more rules specified by the storage handling request, an alert to the data consumer or analytics consumer that data or analytics concerning the data or analytics removal.

\* \* \* \* \*